Oct. 26, 1948.　　　　J. C. SHOTTON　　　　2,452,397

SMOKING PIPE

Filed Jan. 10, 1946

INVENTOR.
John C. Shotton,
BY
Hull West,
ATTORNEYS

Patented Oct. 26, 1948

2,452,397

UNITED STATES PATENT OFFICE 2,452,397

SMOKING PIPE

John C. Shotton, Lakewood, Ohio

Application January 10, 1946, Serial No. 640,176

1 Claim. (Cl. 131—172)

This invention relates to pipes and has for one of its objects to provide a stem which can be quickly applied to the stem of a pipe bowl and which, when so applied, will provide a strong and unbreakable connection therewith.

A further object of the invention is to provide means whereby, when the stems with which pipes are generally equipped, or the tenons of the same, are broken, new stems can be quickly and conveniently applied to the bowl stems and which when so applied, will provide strong and durable connections therewith.

A further object of the invention is to provide means, including my pipe stem, whereby, when the foregoing breakages occur, my new stems can be conveniently applied to the bowl stems and form close and secure connections therewith.

Figure 1:
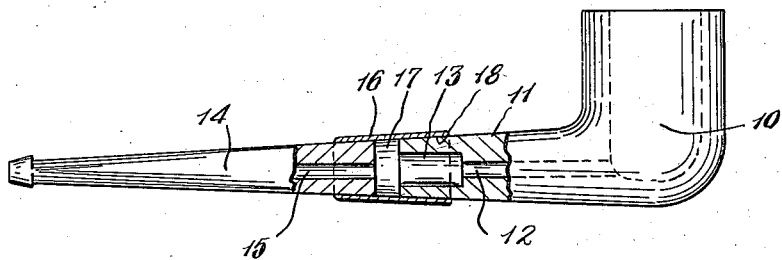
Figure 2:
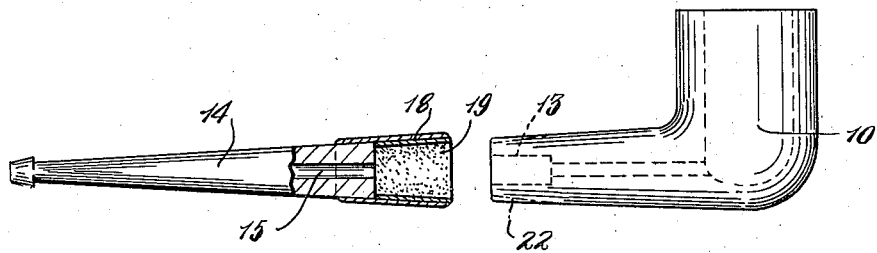
Figure 3:
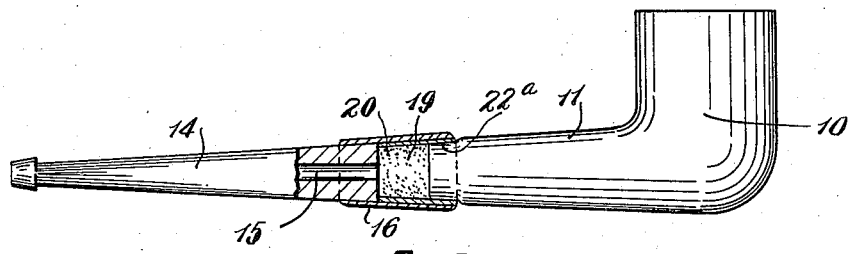
Figure 4:
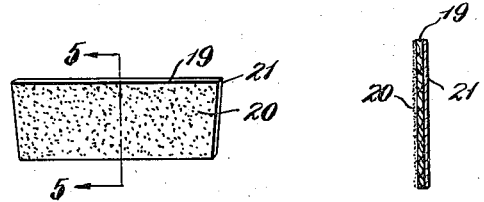
Figure 5:
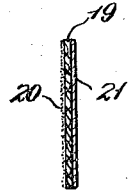

I accomplish these objects in and through the construction and arrangement of parts shown in the drawings hereof wherein Fig. 1 represents a sectional elevational view of a pipe having a stem constructed in accordance with my invention connected to a conventional bowl stem; Fig. 2 a view, showing the pipe bowl and its stem in elevation and my stem in sectional elevation, the ferrule or coupling end of the pipe stem being provided with means whereby the bowl stem may be subjected to a treatment which will enable the ferrule of my pipe stem thereafter to be closely and securely fitted upon the bowl stem; Fig. 3 a view, similar to Fig. 2, showing the manner in which the ferrule of my pipe stem shown in Fig. 2 can operate upon the end of the bowl stem in order to enable a close fit thereafter to be obtained between the ferrule and the bowl stem; Fig. 4 a side elevational view of the temporary liner with which the ferrule of my pipe stem is provided in performing the operation of shaping the end of the bowl stem for reception of the ferrule; and Fig. 5 a sectional view taken on the line 5—5 of Fig. 4.

Describing the parts by reference characters, 10 denotes the bowl and 11 the bowl stem of a pipe of standard construction, the stem being provided with a bore 12. The bowls and stems of pipes of the type shown are usually made of briar, which at times is difficult to obtain and which when obtainable, is expensive. The stems for these pipes are usually provided each with a tenon having a bore registering with and forming an extension of the bore of the stem and which tenon is adapted to be received within a socket, indicated in dotted lines at 13 in Figs. 1 and 2.

In assembling pipe stems as usually constructed upon their bowl stems, it is frequently impossible to obtain such axial alignment between the bores of the pipe stems and the bores of the bowl stems as will insure smooth unbroken junctions between the portions of the pipe stems from which the tenons extend and the portions of the bowl stems against which they abut. In order to obtain this smooth and unbroken surface, it is necessary to subject the abutting portions of the pipe stems and the bowl stems to the action of sandpaper or other grinding means, thereby to provide smooth and unbroken surfaces across the joints between such abutting portions and thereafter to impart a color finish to the portions which have been thus treated which will make them harmonize with the adjacent portions of the pipe stem and bowl stem. When the tenons of pipe stems have been broken, it has been customary for the owners of the pipes to return the same and the stems thereof to the dealers from whom they have purchased the same and request that the stems be repaired. Because of the practical impossibility of obtaining a smooth and unbroken joint between the end of a new stem, provided with a tenon, and the end of the bowl stem in which the liner is inserted without resorting to the grinding or sandpapering operation referred to hereinbefore, and because this operation mars the finish which has been imparted heretofore to the bowl stem, dealers have frequently furnished new pipes complete to customers whose pipe stems have become injured in the manner described rather than make, or attempt to make, the necessary repairs.

Due to the manner in which I have constructed my pipe stem and the manner in which it is operated, it may be applied to the bowl stem of either a new pipe or of a pipe the bowl stem whereof has been shortened by breakage, without necessity of resorting to a refinishing operation, such as has been described. The manner of constructing my pipe stem and of operating the same will now be described.

14 denotes the body of my stem, the same being provided with a bore 15 and carrying at its outer end a tapered ferrule 16 of frusto conical shape and preferably made of metal. This ferrule provides a chamber 17 extending outwardly from the end of the stem proper and, when used in connection with a new bowl and bowl stem, can be slipped upon the mating end of the bowl stem provided that the latter has been furnished with a tapered surface, indicated at 18. Where the bowl stem is not provided with such tapered surface, I utilize my pipe stem and ferrule as a means for providing such tapered surface by fitting within the chamber of the ferrule a liner consisting of a cloth foundation 19 having an abrasive compound 20, such as Carborundum, incorporated thereupon and secure the liner in place by means of glue 21, or like adhesive. This liner is fitted within the inner surface of the chamber 17 of the ferrule and the ferrule is then slipped upon the end of the bowl stem and the ferrule and bowl stem are subjected to a relatively rotary movement until a tapered seat 22 is provided upon the latter, said seat being indicated by broken lines on Fig. 2, and a shorter seat being indicated at 22a in Fig. 3.

When the seating surface has thus been provided, I remove the liner from the ferrule, which can be conveniently accomplished by placing the ferrule in warm water to soften the glue, and thereafter the ferrule can be slipped upon the tapered end of the bowl stem providing therewith a permanent and sightly coupling, as shown in Fig. 1, it being noted that the ends of the ferrule are rounded off.

A stem constructed in the manner described herein has a wide field of application, both for use in making new pipes as well as for use in repairing old pipes. In fact, when used to replace a pipe stem to the bowl stem of which the pipe stem had been fitted, its effect is to produce a new pipe. Still further, these stems can be carried in stock, and the owner of a pipe the stem of which has become injured or broken can effect his own repairs and replace a stem which has thus become injured with one having sufficient strength to last as long as the bowl and its stem.

Having thus described my invention, what I claim is:

The process of making a pipe which consists in forming a pipe stem and providing the same with a bore extending therethrough adapted to register with the bore of a bowl stem; fitting upon the outer end of the pipe stem an extension having a substantially frusto-conical interior, the outer end of such interior being of greater internal diameter than its inner end and adapted to receive therewithin a bowl stem; providing said extension with an abrasive liner; inserting within the said liner the stem of a pipe bowl having a bore therethrough; imparting relative rotary movement between the bowl stem and the pipe stem thereby to provide the end of the bowl stem with a substantially frusto-conical tapered surface adapted to form a close connection with the interior surface of the said extension; removing the liner from said extension; and fitting the said extension upon the tapered end of the bowl stem.

JOHN C. SHOTTON.

REFERENCES CITED

The following references are of record in the file of this patent:

UNITED STATES PATENTS

| Number | Name | Date |
| --- | --- | --- |
| 169,565 | Merriam | Nov. 2, 1875 |
| 702,708 | Cunningham | June 17, 1902 |